US009860501B2

(12) United States Patent
Chen et al.

(10) Patent No.: US 9,860,501 B2
(45) Date of Patent: Jan. 2, 2018

(54) PROJECTION SYSTEM AND PROJECTION METHOD

(71) Applicant: INSTITUTE FOR INFORMATION INDUSTRY, Taipei (TW)

(72) Inventors: Pin-Liang Chen, New Taipei (TW); Ping-Che Yang, Taipei (TW); Tsun Ku, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 0 days.

(21) Appl. No.: 15/133,243

(22) Filed: Apr. 20, 2016

(65) Prior Publication Data

US 2017/0142380 A1    May 18, 2017

(30) Foreign Application Priority Data

Nov. 18, 2015  (TW) .............................. 104138068 A

(51) Int. Cl.
 *H04N 9/31* (2006.01)
 *G06F 17/30* (2006.01)
 *G06Q 50/12* (2012.01)

(52) U.S. Cl.
 CPC ..... *H04N 9/3185* (2013.01); *G06F 17/30247* (2013.01); *G06Q 50/12* (2013.01); *H04N 9/3147* (2013.01); *H04N 9/3179* (2013.01)

(58) Field of Classification Search
 CPC ....... H04N 9/3185; H04N 9/3147; H04N 9/31
 USPC ..... 348/744, 745, 383, 143, 140, 94, 42, 51, 348/52; 353/48
 See application file for complete search history.

(56) References Cited

U.S. PATENT DOCUMENTS

| 9,316,890 | B2* | 4/2016 | Motoyama ........... G03B 21/142 |
| 2009/0079942 | A1 | 3/2009 | Lee et al. |
| 2014/0029468 | A1 | 1/2014 | Akgul et al. |
| 2014/0254890 | A1 | 9/2014 | Bergman et al. |
| 2015/0154440 | A1 | 6/2015 | Rosenkrantz |

OTHER PUBLICATIONS

The office action of the corresponding Taiwan application dated Jul. 7, 2016.

* cited by examiner

*Primary Examiner* — Michael Lee
*Assistant Examiner* — Jean W Desir
(74) *Attorney, Agent, or Firm* — CKC & Partners Co., Ltd.

(57) ABSTRACT

A projection method includes sending an identification signal, receiving an identification response signal corresponding to the identification signal, acquiring a display information from a database according to the identification response signal, acquiring a plurality of angles of a plurality of projection devices relative to an orientation of the first device and a plurality of distances between the projection devices and the first device according to the orientation of the first device and the location of the first device, and controlling a first projection device of the projection devices to project the display information according to the angles of the projection devices relative to an orientation of the first device and the distances between the projection devices and the first device.

20 Claims, 6 Drawing Sheets

US 9,860,501 B2

PROJECTION SYSTEM AND PROJECTION METHOD

RELATED APPLICATIONS

This application claims priority to Taiwan Application Serial Number 104138068, filed Nov. 18, 2015, which is herein incorporated by reference.

BACKGROUND

Field of Invention

The present disclosure relates to an electronic system and a method. More particularly, the present disclosure relates to a projection system and a projection method.

Description of Related Art

With advances in technology, service systems are widely used in our daily lives.

A typical service system acquires identifications of customers by capturing face images of the costumers and compares the captured images to face images in a database. Subsequently, the service system displays information relevant to the customers on a display. However, in such a service system, the face images of the customers have to be previously stored in the database. Additionally, since face image comparison requires significant time, it is not possible to provide comparison results rapidly. Moreover, waiters/waitresses have to watch the display to acquire the information relevant to the customers. Therefore, such a service system is suitable for only a limited number of different types of applications.

Thus, a better way is desired.

SUMMARY

One aspect of the present disclosure is related to a projection system. In accordance with one embodiment of the present disclosure, the projection system includes a plurality of projection devices, a first device, and a second device. The first device is configured for sending an identification signal, and receiving an identification response signal corresponding to the identification signal. The second device is configured for acquiring a display information from a database according to the identification response signal, acquiring a plurality of angles of the projection devices relative to an orientation of the first device and a plurality of distances between the projection devices and the first device according to the orientation of the first device and the location of the first device, and controlling a first projection device of the projection devices to project the display information according to the angles of the projection devices relative to an orientation of the first device and the distances between the projection devices and the first device.

In accordance with one embodiment of the present disclosure, the identification signal is sent from the first device to a third device, and the identification response signal is generated and sent by the third device according to the identification signal.

In accordance with one embodiment of the present disclosure, the projection devices are 3D projection devices.

In accordance with one embodiment of the present disclosure, the second device is further configured for calculating an estimated location and an estimated orientation of the first device according to a moving speed and a moving direction of the first device, acquiring a plurality of estimated angles of the projection devices relative to the estimated orientation of the first device and a plurality of estimated distances between locations of the projection devices and the estimated location of the first device according to the estimated orientation of the first device and the estimated location of the first device, determining a second projection device of the projection devices according to the estimated angles of the projection devices relative to the estimated orientation of the first device and the estimated distances between locations of the projection devices and the estimated location of the first device, and controlling a first projection device of the projection devices to project the display information according to the angles of the projection devices relative to an orientation of the first device and the distances between the projection devices and the first device.

In accordance with one embodiment of the present disclosure, the second device is further configured for switching to use the second projection device to project the display information when a distance between the first device and the first projection device is greater than a predetermined threshold.

Another aspect of the present disclosure is related to a projection method. In accordance with one embodiment of the present disclosure, the projection method includes sending, through a first device, an identification signal; receiving, through the first device, an identification response signal corresponding to the identification signal; acquiring, through a second device, a display information from a database according to the identification response signal; acquiring, through the second device, a plurality of angles of a plurality of projection devices relative to an orientation of the first device and a plurality of distances between the projection devices and the first device according to the orientation of the first device and the location of the first device; and controlling, through the second device, a first projection device of the projection devices to project the display information according to the angles of the projection devices relative to an orientation of the first device and the distances between the projection devices and the first device.

In accordance with one embodiment of the present disclosure, the identification signal is sent from the first device to a third device, and the identification response signal is generated and sent by the third device according to the identification signal.

In accordance with one embodiment of the present disclosure, the projection devices are 3D projection devices.

In accordance with one embodiment of the present disclosure, the projection method further includes calculating, through the second device, an estimated location and an estimated orientation of the first device according to a moving speed and a moving direction of the first device; acquiring, through the second device, a plurality of estimated angles of the projection devices relative to the estimated orientation of the first device and a plurality of estimated distances between locations of the projection devices and the estimated location of the first device according to the estimated orientation of the first device and the estimated location of the first device; determining, through the second device, a second projection device of the projection devices according to the estimated angles of the projection devices relative to the estimated orientation of the first device and the estimated distances between the locations of the projection devices and the estimated location of the first device; and switching, through the second device, to use the second projection device to project the display information.

In accordance with one embodiment of the present disclosure, the step of switching to use the second projection device to project the display information further includes switching, through the second device, to use the second projection device to project the display information when a distance between the first device and the first projection device is greater than a predetermined threshold.

Another aspect of the present disclosure is related to a projection system. In accordance with one embodiment of the present disclosure, the projection system includes at least one projection device, a first device, and a second device. The projection device has a rotating mechanism. The first device is configured for sending an identification signal, and receiving an identification response signal corresponding to the identification signal. The second device is configured for acquiring a display information from a database according to the identification response signal, acquiring at least one distance between the at least one projection device and the first device according to a present location of the first device, controlling the rotating mechanism to rotate the at least one projection device according to a present orientation of the first device, and controlling the at least one projection device to project the display information according to the at least one distance between the at least one projection device and the first device.

In accordance with one embodiment of the present disclosure, the at least one projection device includes a plurality of projection devices. The second device is further configured for determining a first projection device from the projection devices according to distances between the projection devices and the first device, rotating the first projection device of the projection devices according to the present orientation of the first device, and controlling the first projection device to project the display information according to the a distance between the first projection device and the first device.

In accordance with one embodiment of the present disclosure, the second device is further configured for calculating an estimated location and an estimated orientation of the first device according to a moving speed and a moving direction of the first device, acquiring a plurality of estimated distances between locations of the projection devices and the estimated location of the first device according to the estimated location of the first device, determining a second projection device of the projection devices according to the estimated distances between the locations of the projection devices and the estimated location of the first device, rotating the second projection device according to the estimated orientation of the first device, and switching to use the second projection device to project the display information.

In accordance with one embodiment of the present disclosure, the second device is further configured for switching to use the second projection device to project the display information when a distance between the first device and the first projection device is greater than a predetermined threshold.

In accordance with one embodiment of the present disclosure, the identification signal is sent from the first device to a third device, and the identification response signal is generated and sent by the third device according to the identification signal.

Another aspect of the present disclosure is related to a projection method. In accordance with one embodiment of the present disclosure, the projection method includes sending, through a first device, an identification signal; receiving, through the first device, an identification response signal corresponding to the identification signal; acquiring, through a second device, a display information from a database according to the identification response signal; acquiring, through a second device, at least one distance between at least one projection device and the first device according to a present location of the first device; controlling, through a second device, the rotating mechanism to rotate the at least one projection device according to a present orientation of the first device; and controlling, through a second device, the at least one projection device to project the display information according to the at least one distance between the at least one projection device and the first device.

In accordance with one embodiment of the present disclosure, the at least one projection device includes a plurality of projection devices. The projection method further includes determining, through a second device, a first projection device from the projection devices according to distances between the projection devices and the first device. The step of controlling the rotating mechanism to rotate the at least one projection device according to the present orientation of the first device includes rotating, through a second device, the first projection device of the projection devices according to the present orientation of the first device. The step of controlling the at least one projection device to project the display information according to the at least one distance between the at least one projection device and the first device includes controlling, through a second device, the first projection device to project the display information according to the a distance between the first projection device and the first device.

In accordance with one embodiment of the present disclosure, the method further includes calculating, through a second device, an estimated location and an estimated orientation of the first device according to a moving speed and a moving direction of the first device; acquiring, through a second device, a plurality of estimated distances between locations of the projection devices and the estimated location of the first device according to the estimated location of the first device; determining, through a second device, a second projection device of the projection devices according to the estimated distances between the locations of the projection devices and the estimated location of the first device; rotating, through a second device, the second projection device according to the estimated orientation of the first device; and switching, through a second device, to use the second projection device to project the display information.

In accordance with one embodiment of the present disclosure, the step of switching to use the second projection device to project the display information further includes switching to use the second projection device to project the display information when a distance between the first device and the first projection device is greater than a predetermined threshold.

In accordance with one embodiment of the present disclosure, the identification signal is sent from the first device to a third device, and the identification response signal is generated and sent by the third device according to the identification signal.

Through utilizing one embodiment described above, one of the projection devices with suitable location and angle can be selected to project the display information. In such a manner, a waiter/waitress can obtain customer information via the projected image, such that the service quality can be enhanced.

DETAILED DESCRIPTION

Figure 1:
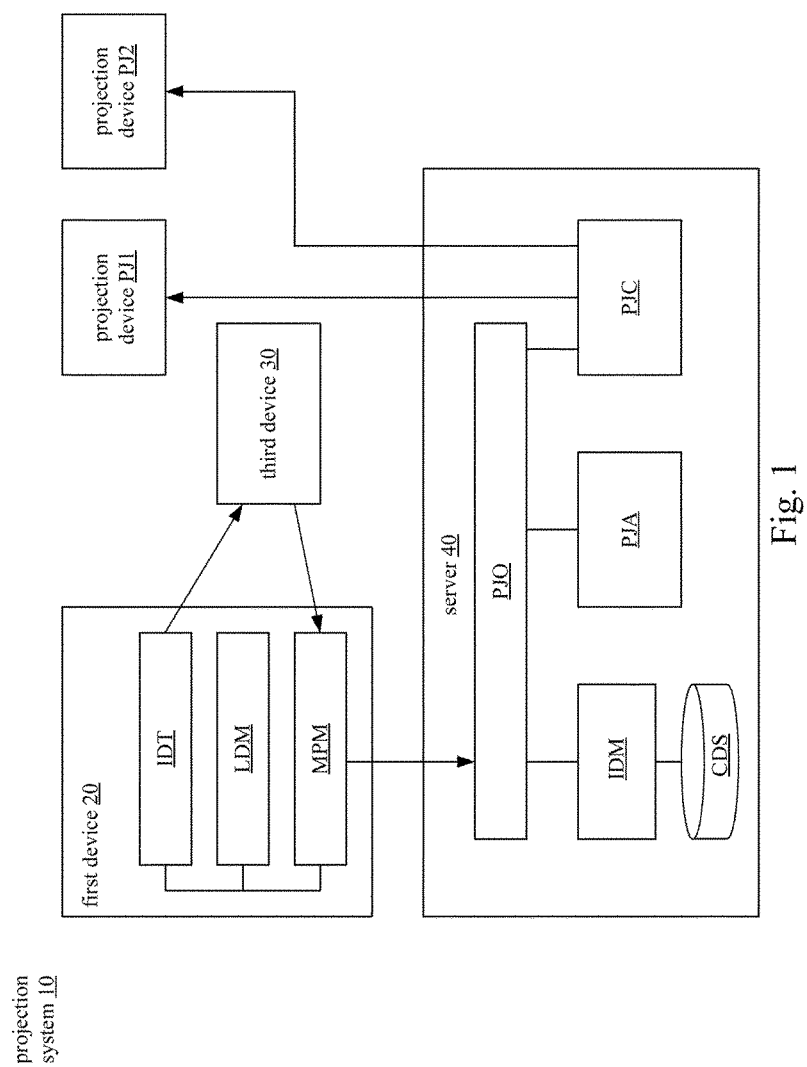
FIG. 1 is a schematic diagram of a projection system according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, when an element is referred to as being "connected" or "electrically connected" to another element, it can be directly connected to the other element or intervening elements may be present. In contrast, when an element is referred to as being "directly connected" to another element, there are no intervening elements present. Moreover, "electrically connect" or "connect" can further refer to the interoperation or interaction between two or more elements.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. §112(f). In particular, the use of "step of" in the claims herein is not intended to invoke the provisions of 35 U.S.C. §112(f).

One aspect of the present disclosure is related to a projection system. The projection system can be used in a restaurant, a café, or another indoor space, to rapidly provide information required by a waiter/waitress. To facilitate the description to follow, in the following paragraphs, a projection system used in a restaurant is taken as a descriptive example. However, the present disclosure is not limited to this embodiment.

FIG. 1 is a schematic diagram of a projection system 10 according to one embodiment of the present disclosure. In this embodiment, the projection system 10 includes a first device 20, a server 40 (second device), and a plurality of projection devices PJ1, PJ2. In this embodiment, the first device 20 can communicate with the server 40. The server 40 can communicate with the projection devices PJ1, PJ2.

It should be noted that, in this embodiment, two projection devices PJ1, PJ2 are taken as an example. However, another embodiment using another number of the projection devices is within the contemplated scope of the present disclosure.

In this embodiment, the first device 20 may be a mobile device of a waiter/waitress. In this embodiment, the projection devices PJ1, PJ2 can be previously disposed at certain locations of a restaurant (e.g., disposed at certain locations of the ceiling). In one embodiment of the present disclosure, the first device 20 can detect a mobile device (e.g., a third device 30) of an adjacent customer, to acquire customer identification information and transmit the customer identification information to the server 40. The server 40 can acquire corresponding customer information according to the customer identification information and control one of the projection devices PJ1, PJ2 to project the corresponding customer information according to a present location and a present orientation of the first device 20, so that the waiter/waitress can watch the projected customer information. In some specific embodiments, the projection devices PJ1, PJ2 are 3D projection devices. In one embodiment, the air-based 3D projection devices are used, so that only the waiter/waitress at a specific location can watch the projected customer information clearly through scattering of light. In another embodiment, a viewing angle control filter or microlouver technology may be used, so that only the waiter/waitress at a specific location can watch the projected customer information clearly. In such a manner, the privacy of the customer can be ensured.

Details of the projection system 10 will be described in the paragraphs below, and the present disclosure is not limited in the embodiments below.

In one embodiment, the first device 20 may include an identification signal transmitting module IDT, a location detecting module LDM, and a message processing module MPM. The identification signal transmitting module IDT, the location detecting module LDM, and the message processing module MPM are electrically connected. In one embodiment, all of the identification signal transmitting module IDT, the location detecting module LDM, and the message processing module MPM can be realized by, for example, one or more central processing unit (CPU), one or more microprocessor, or another suitable calculating device (s).

In one embodiment, the server 40 can include a projection operating module PJO, an identification module IDM, a projection location analyzing module PJA, a projection device controlling module PJC, and a customer database CDS. The projection operating module PJO is electrically connected to the identification module IDM, the projection location analyzing module PJA, and the projection device controlling module PJC. The identification module IDM is electrically connected to the customer database CDS.

In one embodiment, all of the projection operating module PJO, the identification module IDM, the projection location analyzing module PJA, and the projection device controlling module PJC can be realized by, for example, one or more central processing unit (CPU), one or more microprocessor, or another suitable calculating device(s). The customer database CDS can be realized by, for example, a non-transitory computer readable medium such as a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this disclosure pertains.

In one embodiment, the identification signal transmitting module IDT can be configured to transmit an identification signal via a communication component (not shown). In one embodiment, the identification signal is transmitted toward the first device 20 (toward a predetermined direction). That is, the transmission of the identification signal is directional. In such a configuration, only a mobile device located at a certain direction of the waiter/waitress can receive the identification signal. In one embodiment, a metal mask may be disposed around the communication component, so as to make the identification signal be transmitted toward the first device 20 (toward the predetermined direction).

In one embodiment, a third device 30 located at the predetermined direction of the first device 20 can receive the identification signal. The third device 30 may be a customer's mobile device. The third device 30 may install an application (e.g., a preservation application) and have identification information of the customer. When the third device 30 and the first device 20 are close to each other, the third device 30 can use the application to receive the identification signal, generate an identification response signal corresponding to the identification signal, and transmit the identification response signal to the first device 20. The identification response signal includes identification of the customer.

In one embodiment, the location detecting module LDM can be configured to detect a present location and a present orientation of the first device 20. In one embodiment, the location detecting module LDM positions the first device 20 and acquire the present location of the first device 20 by receiving Beacon signals transmitted from Beacon transmitters disposed at different locations of the restaurant, or by using a positioning system therein (e.g., by a GPS system, a Wi-Fi positioning system, a RFID positioning system, a bluetooth positioning system, a ZigBee positioning system, and by an infrared ray positioning system). In another embodiment, the location detecting module LDM acquires the present orientation of the first device 20 via, for example, a gyroscope (not shown) and an electronic compass (not shown) within the first device 20.

In one embodiment, the message processing module MPM is configured to receive the identification response signal from the third device 30 via a communication component (not shown), and configured to provide the present location and the present orientation of the first device 20 and the identification response signal to the server 40 via the communication component.

In one embodiment, the projection operating module PJO is configured to receive the present location and the present orientation of the first device 20 and the identification response signal, and to communicate with the identification module IDM, the projection location analyzing module PJA, and the projection device controlling module PJC.

The identification module IDM is configured to acquire display information from the customer database CDS according to the identification response signal. In one embodiment, the display information may be information of the customer (e.g., name and preference).

The projection location analyzing module PJA is configured to acquire angles of the projection devices PJ1, PJ2 relative to the present orientation of the first device 20 and distances between the projection devices PJ1, PJ2 and the first device 20 according to the present orientation of the first device 20 and the present location of the first device 20. The projection location analyzing module PJA is further configured to determine to use which one of the projection devices PJ1, PJ2 to project the display information according to the angles of the projection devices PJ1, PJ2 relative to the present orientation of the first device 20 and the distances between the projection devices PJ1, PJ2 and the first device 20.

For example, under a condition that a projection direction of the projection device PJ1 and the present orientation of the first device 20 (e.g., identical to the facing direction of the waiter/waitress) are more similar than a projection direction of the projection device PJ2 and the present orientation of the first device 20, and the distance between the projection device PJ1 and the first device 20 is less than the distance between the projection device PJ2 and the first device 20, the projection location analyzing module PJA may select the projection device PJ1 to project the display information.

In some embodiment, the angles of the projection devices PJ1, PJ2 relative to the present orientation of the first device 20 and distances between the projection devices PJ1, PJ2 and the first device 20 may have different weight. The projection location analyzing module PJA may determine to use which one of the projection devices PJ1, PJ2 to project the display information according to weighted values.

The projection device controlling module PJC is configured to control the selected one of the projection devices PJ1, PJ2 to project the display information.

In such a configuration, one of the projection devices with suitable location and angle can be selected to project the display information. In such a manner, a waiter/waitress can obtain customer information via the projected image, such that the service quality can be enhanced.

Figure 2:
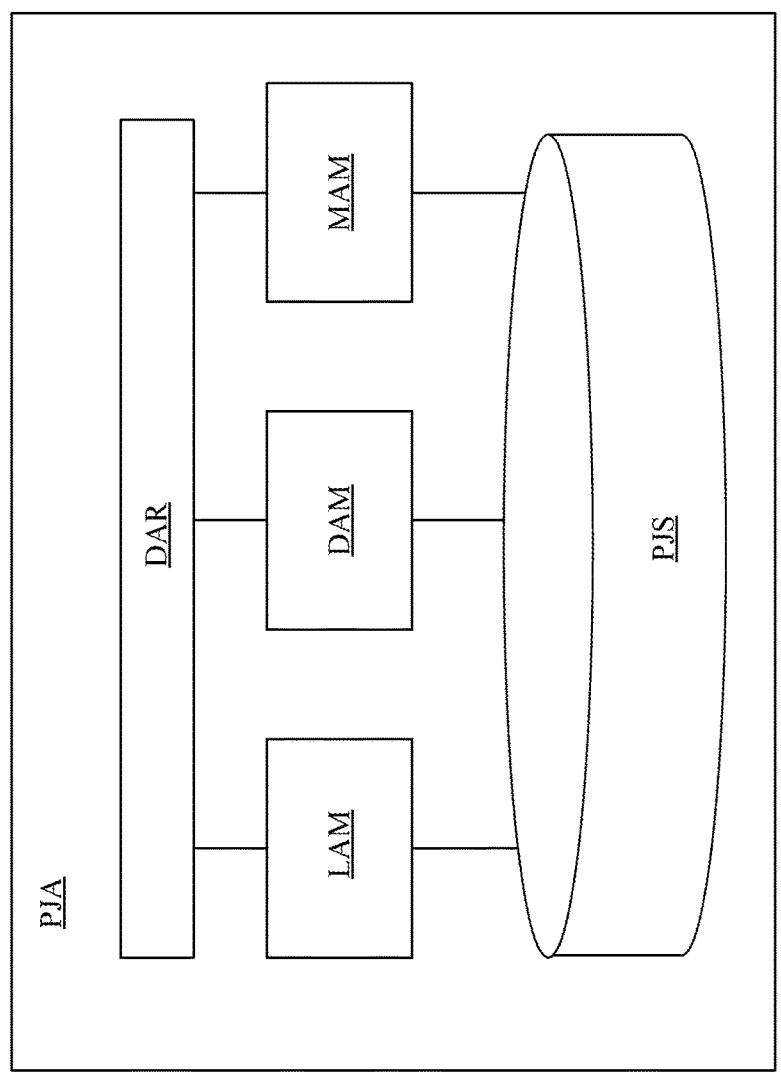
FIG. 2 is a schematic diagram of a projection location analyzing module according to one embodiment of the present disclosure.

FIG. 2 is a schematic diagram of the projection location analyzing module PJA according to one embodiment of the present disclosure. In this embodiment, the projection location analyzing module PJA may include a data gathering module DAR, a location and angle analyzing module LAM, a distance analyzing module DAM, a movement analyzing module MAM, and a projection device data storage device PJS. The data gathering module DAR can be electrically connected to the location and angle analyzing module LAM, the distance analyzing module DAM, and the movement analyzing module MAM. The projection device data storage device PJS can be electrically connected to the location and angle analyzing module LAM, the distance analyzing module DAM, and the movement analyzing module MAM.

In this embodiment, all of the data gathering module DAR, the location and angle analyzing module LAM, the distance analyzing module DAM, and the movement analyzing module MAM can be realized by, for example, one or more central processing unit (CPU), one or more microprocessor, or another suitable calculating device(s). The projection device data storage device PJS can be realized by, for example, a non-transitory computer readable medium such as a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this disclosure pertains.

In this embodiment, the projection device data storage device PJS is configured to store information of the projection devices PJ1, PJ2 (e.g., locations and projection directions), and provide the information of the projection devices PJ1, PJ2 to the location and angle analyzing module LAM, the distance analyzing module DAM, and the movement analyzing module MAM.

The data gathering module DAR is configured to communicate with the location and angle analyzing module LAM, the distance analyzing module DAM, and the movement analyzing module MAM to gather and transmit data.

The distance analyzing module DAM is configured to analyze the distances between the projection devices PJ1, PJ2 and the first device 20. In one embodiment, the distance analyzing module DAM calculates the distance between the projection devices PJ1, PJ2 and the first device 20 by using the locations of the projection devices PJ1, PJ2 previously stored in the projection device data storage device PJS and the present location of the first device 20.

The location and angle analyzing module LAM is configured to analyze the angles of the projection devices PJ1, PJ2 relative to the present orientation of the first device 20. In one embodiment, the location and angle analyzing module LAM calculates the angles of the projection devices PJ1, PJ2 relative to the present orientation of the first device 20 by using the direction data of the projection devices PJ1, PJ2 previously stored in the projection device data storage device PJS and the present orientation of the first device 20. Subsequently, the location and angle analyzing module LAM determines to use which one of the projection devices PJ1, PJ2 to project the display information according to the angles of the projection devices PJ1, PJ2 relative to the present orientation of the first device 20 and the distances between the projection devices PJ1, PJ2 and the first device 20.

The movement analyzing module MAM is configured to calculate an estimated location and an estimated orientation of the first device 20 according to a moving speed and a moving direction of the first device 20, and acquire a plurality of estimated angles of the projection devices PJ1, PJ2 relative to the estimated orientation of the first device 20 and a plurality of estimated distances between locations of the projection devices PJ1, PJ2 and the estimated location of the first device 20 according to the estimated orientation of the first device 20 and the estimated location of the first device 20. Subsequently, the movement analyzing module MAM may be configured to determine a prepared projection device from the projection devices PJ1, PJ2 according to the estimated angles of the projection devices relative to the estimated orientation of the first device 20 and the estimated distances between locations of the projection devices PJ1, PJ2 and the estimated location of the first device 20.

In one embodiment, after the prepared projection device is determined, the prepared projection device can be waked up (e.g., activated from sleep mode). When the first device 20 is moved to a certain location, the server 40 can control the projection devices PJ1, PJ2, so as to make the display information, which is originally projected by the original projection device, be switched to be projected by the prepared projection device. In one embodiment, the display information can be switched to be projected by the prepared projection device when a distance between the first device 20 and the original projection device is greater than (or smaller than) a predetermined threshold. In another embodiment, the display information, which is originally projected by the original projection device, is switched to be projected by the prepared projection device according to the angles of the projection devices PJ1, PJ2 relative to the present orientation of the first device 20 and the distances between the projection devices PJ1, PJ2 and the first device 20. For example, the switching operation can be performed when a weighted value corresponding to the prepared projection device is greater than or less than a weighted value corresponding to the original projection device. In such a configuration, even if the waiter/waitress moves away, he/she can still watch the customer information.

It should be noted that, in different embodiments, all of or part of the function of the server 40 can be realized on the first device 20, and the present disclosure is not limited by the embodiment described above.

Figure 3:
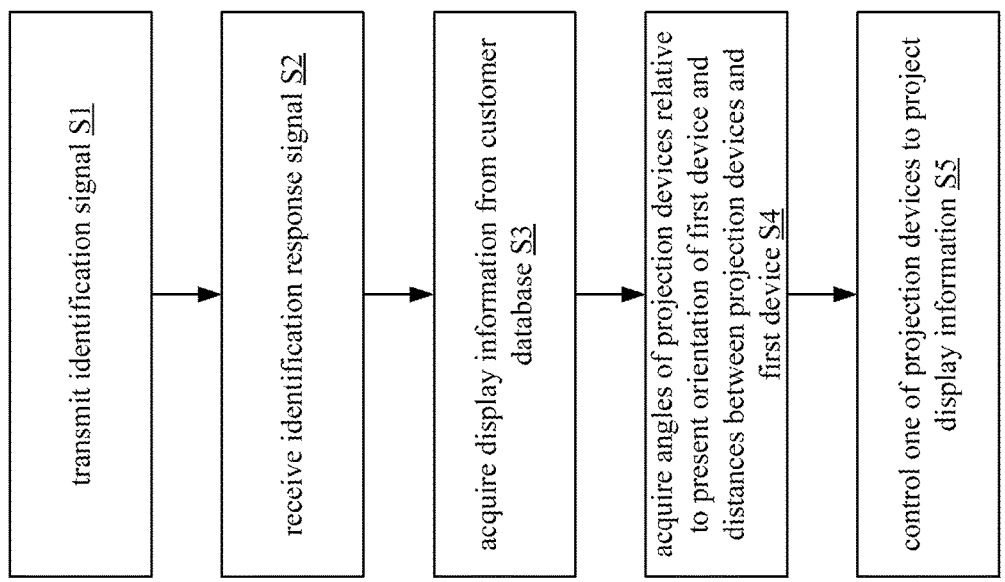
FIG. 3 is a flowchart of a projection method according to one embodiment of the present disclosure.

In the following paragraphs, details of the present disclosure are provided with reference to a projection method 200 shown in FIG. 3. However, the present disclosure is not limited to the embodiment below.

It should be noted that, the projection method 200 can be applied to a projection device having a structure that is the same as or similar to the structure shown in FIG. 1. To simplify the description below, in the following paragraphs, the embodiment shown in FIG. 1 will be used as an example to describe the projection method 200 according to an embodiment of the present disclosure. However, the present disclosure is not limited to application to the embodiment shown in FIG. 1.

Additionally, the projection method 200 can be implemented as a computer program stored in a non-transitory computer readable medium to be read for controlling a computer or an electronic device to execute the projection method 200. The computer program can be stored in a non-transitory computer readable medium such as a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this disclosure pertains.

In addition, it should be noted that, in the steps of the following projection method 200, no particular sequence is required unless otherwise specified. Moreover, the following steps also may be performed simultaneously or the execution times thereof may at least partially overlap.

Furthermore, the steps of the following projection method 200 may be added, replaced, and/or eliminated as appropriate, in accordance with various embodiments of the present disclosure.

In this embodiment, the projection method 200 includes the steps below.

In step S1, the first device 20 transmits an identification signal. Details of the first device 20 transmitting the identification signal can be ascertained with reference to the paragraphs above, and a description in this regard will not be repeated herein.

In step S2, the first device 20 receives an identification response signal corresponding to the identification signal. Details of the identification response signal can be ascertained with reference to the paragraphs above, and a description in this regard will not be repeated herein.

In step S3, the server 40 (the second device) acquires display information from the customer database CDS according to the identification response signal. Details of the display information can be ascertained with reference to the paragraphs above, and a description in this regard will not be repeated herein.

In step S4, the server 40 (the second device) acquires angles of the projection devices PJ1, PJ2 relative to the present orientation of the first device 20 and distances between the projection devices PJ1, PJ2 and the first device 20 according to the present orientation of the first device 20 and the present location of the first device 20.

In step S5, the server 40 (the second device) controls one of the projection devices PJ1, PJ2 to project the display information according to the angles of the projection devices PJ1, PJ2 relative to the present orientation of the first device 20 and the distances between the projection devices PJ1, PJ2 and the first device 20.

In one embodiment, after the server 40 controls one of the projection devices PJ1, PJ2 (e.g., an original projection device) to project the display information (after step S5), the server 40 may further determine a prepared projection device from the projection devices PJ1, PJ2 according to a moving speed and a moving direction of the first device 20, so that when the first device 20 is moved to a certain location, the server 40 can control the projection devices PJ1, PJ2 to make the display information, which is originally projected by the original projection device, be switched to be projected by the prepared projection device. Details in this regard can be ascertained with reference to the paragraph above, and will not be repeated herein.

Through utilizing one embodiment described above, one of the projection devices with suitable location and angle can be selected to project the display information. In such a manner, a waiter/waitress can obtain customer information via the projected image, such that the service quality can be enhanced.

Figure 4:
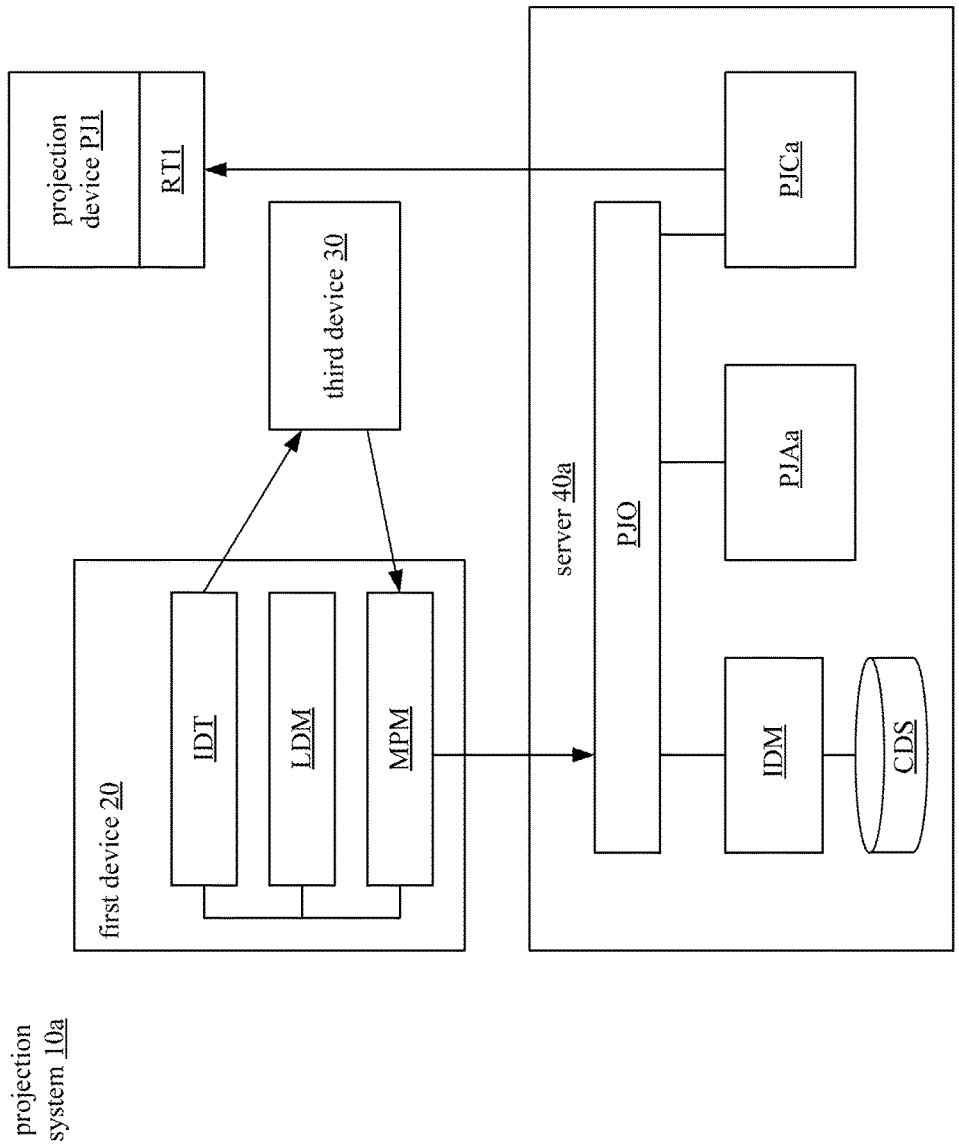
FIG. 4 is another schematic diagram of a projection system according to another embodiment of the present disclosure.

FIG. 4 is a schematic diagram of a projection system 10a according to one embodiment of the present disclosure. In this embodiment, the projection system 10a includes a first device 20, a server 40a (second device), and at least one projection device PJ1. In this embodiment, the first device 20 can communicate with the server 40a. The server 40a can communicate with the projection device PJ1. In this embodiment, the projection device PJ1 has a rotating mechanism RT1. The rotating mechanism RT1 is configured to change the projection direction of the projection device PJ1. In one embodiment, the rotating mechanism RT1 can be realized by using a hydraulic tappet or a stepper motor.

It should be noted that, although one projection device PJ1 is taken as an example in this embodiment, another number of projection devices are within the contemplated scope of the present disclosure.

In this embodiment, the first device 20 may be a mobile device of a waiter/waitress. In this embodiment, the projection device PJ1 can be previously disposed at a certain location of a restaurant (e.g., disposed at a certain location of the ceiling). In one embodiment of the present disclosure, the first device 20 can detect a mobile device (e.g., a third device 30) of an adjacent customer, to acquire customer identification information and transmit the customer identification information to the server 40a. The server 40a can acquire corresponding customer information according to the customer identification information, rotate the rotating mechanism RT1 of the projection device PJ1 according to a present orientation of the first device 20, and control the projection device PJ1 to project the corresponding customer information according to a present distance between the projection device PJ1 and the first device 20, so that the waiter/waitress can watch the projected customer information. In some specific embodiments, the projection device PJ1 is a 3D projection device. In such a configuration, only the waiter/waitress at a specific location can watch the projected customer information dearly, so that the privacy of the customer can be ensured.

In addition, in different embodiments, the projection system 10a may include a plurality of projection devices. The server 40a therein may determine to use which one of the projection device to project the display information, rotate the rotating mechanism of the selected projection device according to the present orientation of the first device 20, and control the selected projection device to project the customer information.

Details of the projection system 10a will be described in the paragraphs below, and the present disclosure is not limited in the embodiments below.

In one embodiment, the first device 20 may include an identification signal transmitting module IDT, a location detecting module LDM, and a message processing module MPM. The first device 20 can be configured to transmit the identification signal to the third device 30. Details of the identification signal transmitting module IDT, the location detecting module LDM, the message processing module MPM, and the third device 30 can be ascertained with reference to the embodiments above, and a description in this regard will not be repeated herein.

In one embodiment, the server 40a can include a projection operating module PJO, an identification module IDM, a projection location analyzing module PJAa, a projection device controlling module PJC, and a customer database CDS. The projection operating module PJO is electrically connected to the identification module IDM, the projection location analyzing module PJAa, and the projection device controlling module PJC. The identification module IDM is electrically connected to the customer database CDS.

In one embodiment, all of the projection operating module PJO, the identification module IDM, the projection location analyzing module PJAa, and the projection device controlling module PJC can be realized by, for example, one or more central processing unit (CPU), one or more microprocessor, or another suitable calculating device(s). The customer database CDS can be realized by, for example, a non-transitory computer readable medium such as a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this disclosure pertains.

In one embodiment, the projection operating module PJO is configured to receive the present location and the present orientation of the first device 20 and the identification response signal from the first device 20, and to communicate with the identification module IDM, the projection location analyzing module PJAa, and the projection device controlling module PJC.

The identification module IDM is configured to acquire display information from the customer database CDS according to the identification response signal. In one embodiment, the display information may be information of the customer (e.g., name and preference).

The projection location analyzing module PJAa is configured to acquire angles of the projection devices in the projection system 10a relative to the present orientation of the first device 20 and distances between the projection devices in the projection system 10a and the first device 20 according to the present orientation of the first device 20 and the present location of the first device 20. In some embodiments, under a condition that the projection system 10a has a plurality of projection devices, the projection location analyzing module PJAa is configured to determine to use which one of the projection devices in the projection system 10a to project the display information according to the distances between the projection devices in the projection system 10a and the first device 20.

For example, under a condition that the distance between a first projection device and the first device 20 is less than the distance between a second projection device and the first device 20, the projection location analyzing module PJAa may select the first projection device to project the display information. As another example, under a condition that the projection system 10a has merely one projection device PJ1, the projection location analyzing module PJAa may select the projection device PJ1 to project the display information.

In addition, the projection location analyzing module PJAa is also configured to determine the rotating angle of the rotating mechanism of the selected projection device according to the orientation of the selected projection device relative to the present orientation of the first device 20.

The projection device controlling module PJC is configured to rotate the rotating mechanism of the selected projection device according to the rotating angle, and configured to control the selected projection device to project the display information according to the distance between the selected projection device and the first device 20.

In such a configuration, the projection direction of the projection device can be rotated to project the customer information. In such a configuration, a waiter/waitress can obtain customer information via the projected image, such that the service quality can be enhanced.

Figure 5:
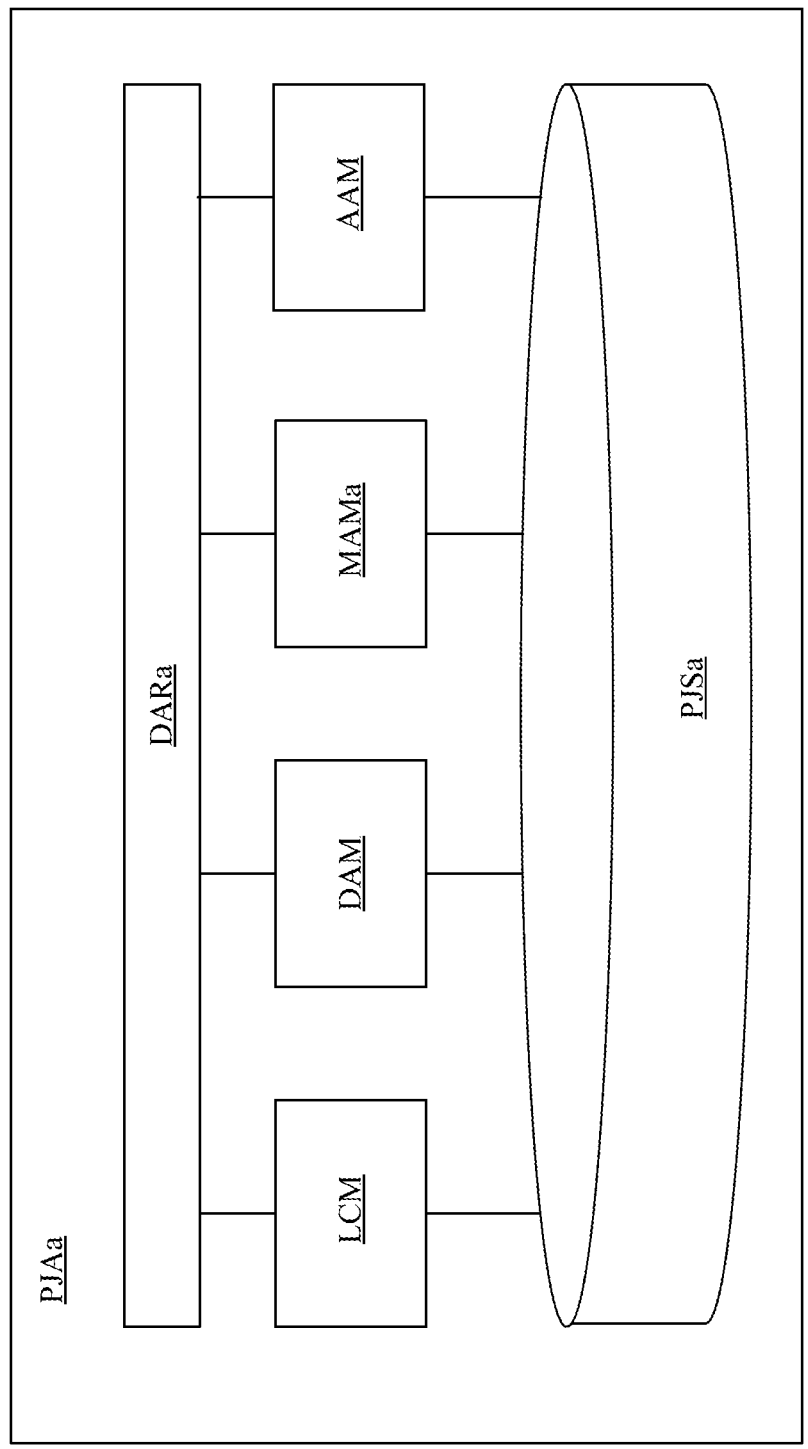
FIG. 5 is a schematic diagram of a projection location analyzing module according to another embodiment of the present disclosure.

FIG. 5 is a schematic diagram of the projection location analyzing module PJAa according to one embodiment of the present disclosure. In this embodiment, the projection location analyzing module PJAa may include a data gathering module DARa, a location analyzing module LCM, a distance analyzing module DAM, a movement analyzing module MAMa, an angle analyzing module AAM, and a projection device data storage device PJSa. The data gathering module DARa can be electrically connected to the location analyzing module LCM, the distance analyzing module DAM, the movement analyzing module MAMa, and the angle analyzing module AAM. The projection device data storage device PJSa can be electrically connected to the location analyzing module LCM, the distance analyzing module DAM, the movement analyzing module MAMa, and the angle analyzing module AAM.

In this embodiment, all of the data gathering module DARa, the location analyzing module LCM, the distance analyzing module DAM, the movement analyzing module MAMa, and the angle analyzing module AAM can be realized by, for example, one or more central processing unit (CPU), one or more microprocessor, or another suitable calculating device(s). The projection device data storage device PJSa can be realized by, for example, a non-transitory computer readable medium such as a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this disclosure pertains.

In this embodiment, the projection device data storage device PJSa is configured to store information of projection devices in the projection system 10a (e.g., locations), and provide the information of the projection devices in the projection system 10a to the location analyzing module LCM, the distance analyzing module DAM, the movement analyzing module MAMa, and the angle analyzing module AAM.

The data gathering module DARa is configured to communicate with the location analyzing module LCM, the distance analyzing module DAM, the movement analyzing module MAMa, and the angle analyzing module AAM to gather and transmit data.

The distance analyzing module DAM is configured to analyze the distances between the projection devices in the projection system 10a and the first device 20.

The location analyzing module LCM is configured to determine to use which one of the projection devices in the projection system 10a to project the display information according to the distances between the projection devices in the projection system and the first device 20.

The angle analyzing module AAM is configured to analyze angles of the projection devices in the projection system 10a relative to the present orientation of the first device 20, and determine the rotating angle of the rotating mechanism of the selected projection device according to the angle of the selected projection device relative to the present orientation of the first device 20.

The movement analyzing module MAMa is configured to calculate an estimated location and an estimated orientation of the first device 20 according to a moving speed and a moving direction of the first device 20, and acquire a plurality of estimated angles of the projection devices PJ1, PJ2 relative to the estimated orientation of the first device 20 and a plurality of estimated distances between locations of the projection devices PJ1, PJ2 and the estimated location of the first device 20 according to the estimated orientation of the first device 20 and the estimated location of the first device 20. Subsequently, the movement analyzing module MAMa may be configured to determine a prepared projection device from the projection devices according to the estimated angles of the projection devices relative to the estimated orientation of the first device 20 and the estimated distances between locations of the projection devices and the estimated location of the first device 20.

In one embodiment, after the prepared projection device is determined, the prepared projection device can be waked up (e.g., activated from sleep mode). In addition, after the prepared projection device is determined, the server 40a can rotate the rotating mechanism of the prepared projection device according to the estimated orientation of the first device 20. When the first device 20 is moved to a certain location, the server 40a can control the display information, which is originally projected by the original projection device, to be switched to be projected by the prepared projection device. In one embodiment, the display information can be switched to be projected by the prepared projection device when a distance between the first device 20 and the original projection device is greater than (or smaller than) a predetermined threshold. In such a configuration, even if the waiter/waitress moves away, he/she can still watch the customer information.

It should be noted that, in different embodiments, all of or part of the function of the server 40a can be realized on the first device 20, and the present disclosure is not limited by the embodiment described above.

Figure 6:
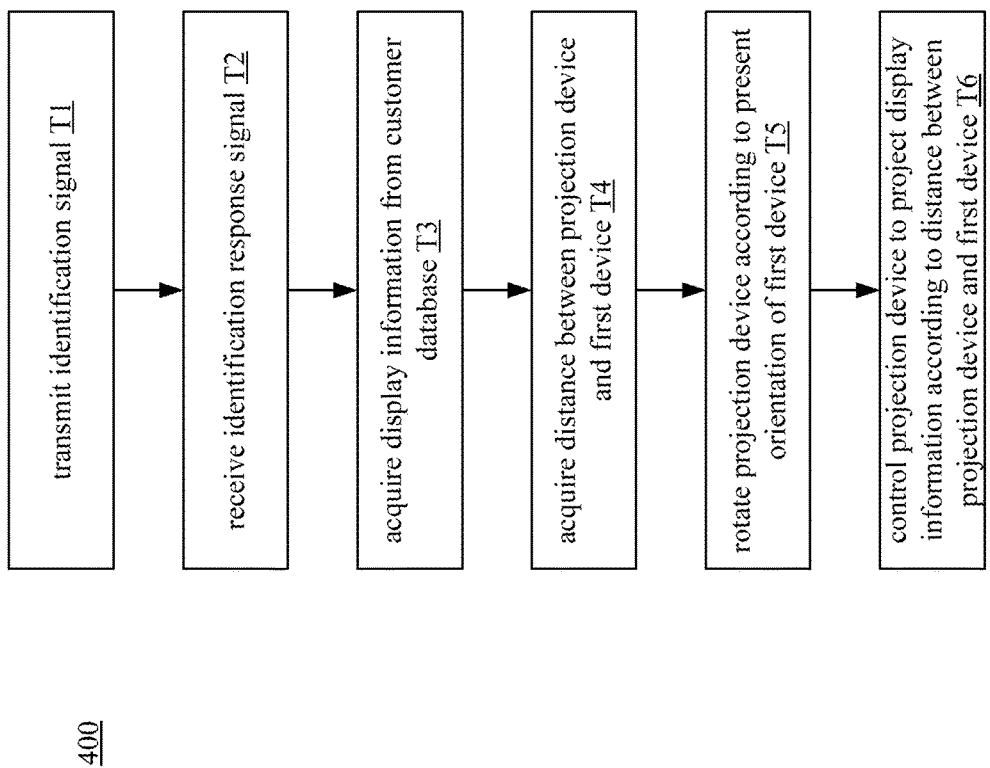
FIG. 6 is a flowchart of a projection method according to another embodiment of the present disclosure.

In the following paragraphs, details of the present disclosure are provided with reference to a projection method 400 shown in FIG. 6. However, the present disclosure is not limited to the embodiment below.

It should be noted that, the projection method 400 can be applied to a projection device having a structure that is the same as or similar to the structure shown in FIG. 4. To simplify the description below, in the following paragraphs, the embodiment shown in FIG. 4 will be used as an example to describe the projection method 400 according to an embodiment of the present disclosure. However, the present disclosure is not limited to application to the embodiment shown in FIG. 4.

Additionally, the projection method 400 can be implemented as a computer program stored in a non-transitory computer readable medium to be read for controlling a computer or an electronic device to execute the projection method 400. The computer program can be stored in a non-transitory computer readable medium such as a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this disclosure pertains.

In addition, it should be noted that, in the steps of the following projection method 400, no particular sequence is required unless otherwise specified. Moreover, the following steps also may be performed simultaneously or the execution times thereof may at least partially overlap.

Furthermore, the steps of the following projection method 400 may be added, replaced, and/or eliminated as appropriate, in accordance with various embodiments of the present disclosure.

In this embodiment, the projection method 400 includes the steps below.

In step T1, the first device 20 transmits an identification signal. Details of the first device 20 transmitting the identification signal can be ascertained with reference to the paragraphs above, and a description in this regard will not be repeated herein.

In step T2, the first device 20 receives an identification response signal corresponding to the identification signal. Details of the identification response signal can be ascertained with reference to the paragraphs above, and a description in this regard will not be repeated herein.

In step T3, the server 40a acquires display information from the customer database CDS according to the identification response signal. Details of the display information can be ascertained with reference to the paragraphs above, and a description in this regard will not be repeated herein.

In step T4, the server 40a acquires a distance between the projection device PJ1 and the first device 20 according to the present location of the first device 20.

In step T5, the server 40a controls the rotating mechanism RT1 of the projection device PJ1 to rotate the projection device PJ1 according to the present orientation of the first device 20.

In step T6, the server 40a controls the projection device PJ1 to project the display information according to the distance between the projection device PJ1 and the first device 20.

In some embodiment, under a condition that the projection system 10a has a plurality of projection devices, in step T4, the server 40a acquires distances between the projection devices and the first device 20 according to the present location of the first device 20, and determines to use which one of the projection devices to project the display information according to the distances between the projection devices and the first device 20.

Subsequently, the server 40a controls the rotating mechanism of the selected projection device to rotate the selected projection device according to the present orientation of the first device 20. Subsequently, the server 40a controls the selected projection device to project the display information according to the distance between the selected projection device and the first device 20.

In one embodiment, after the server 40a controls one of the projection devices (e.g., an original projection device) to project the display information, the server 40a may further determine a prepared projection device from the projection devices according to a moving speed and a moving direction of the first device 20, so that when the first device 20 is moved to a certain location, the server 40 can control the projection devices to make the display information, which is originally projected by the original projection device, be switched to be projected by the prepared projection device. Details in this regard can be ascertained with reference to the paragraph above, and will not be repeated herein.

Through utilizing one embodiment described above, one of the projection devices with suitable location and angle can be selected to project the display information. In such a manner, a waiter/waitress can obtain customer information via the projected image, such that the service quality can be enhanced.

Although the present disclosure has been described in considerable detail with reference to certain embodiments thereof, other embodiments are possible. Therefore, the scope of the appended claims should not be limited to the description of the embodiments contained herein.

What is claimed is:

1. A projection system comprising:
a plurality of projection devices;
a first device configured for:
sending an identification signal; and
receiving an identification response signal corresponding to the identification signal; and
a second device configured for:
acquiring a display information from a database according to the identification response signal;
acquiring a plurality of angles of the projection devices relative to an orientation of the first device and a plurality of distances between the projection devices and the first device according to the orientation of the first device and the location of the first device; and
controlling a first projection device of the projection devices to project the display information according to the angles of the projection devices relative to an orientation of the first device and the distances between the projection devices and the first device.

2. The projection system as claimed in claim 1, wherein the identification signal is sent from the first device to a third device, and the identification response signal is generated and sent by the third device according to the identification signal.

3. The projection system as claimed in claim 1, wherein the projection devices are 3D projection devices.

4. The projection system as claimed in claim 1, wherein the second device is further configured for:

calculating an estimated location and an estimated orientation of the first device according to a moving speed and a moving direction of the first device;
acquiring a plurality of estimated angles of the projection devices relative to the estimated orientation of the first device and a plurality of estimated distances between locations of the projection devices and the estimated location of the first device according to the estimated orientation of the first device and the estimated location of the first device;
determining a second projection device of the projection devices according to the estimated angles of the projection devices relative to the estimated orientation of the first device and the estimated distances between locations of the projection devices and the estimated location of the first device; and
switching to use the second projection device to project the display information.

5. The projection system as claimed in claim 4, wherein the second device is further configured for:
switching to use the second projection device to project the display information when a distance between the first device and the first projection device is greater than a predetermined threshold.

6. A projection method comprising:
sending, through a first device, an identification signal;
receiving, through the first device, an identification response signal corresponding to the identification signal;
acquiring, through a second device, a display information from a database according to the identification response signal;
acquiring, through the second device, a plurality of angles of a plurality of projection devices relative to an orientation of the first device and a plurality of distances between the projection devices and the first device according to the orientation of the first device and the location of the first device; and
controlling, through the second device, a first projection device of the projection devices to project the display information according to the angles of the projection devices relative to an orientation of the first device and the distances between the projection devices and the first device.

7. The projection method as claimed in claim 6, wherein the identification signal is sent from the first device to a third device, and the identification response signal is generated and sent by the third device according to the identification signal.

8. The projection method as claimed in claim 6, wherein the projection devices are 3D projection devices.

9. The projection method as claimed in claim 6 further comprising:
calculating, through the second device, an estimated location and an estimated orientation of the first device according to a moving speed and a moving direction of the first device;
acquiring, through the second device, a plurality of estimated angles of the projection devices relative to the estimated orientation of the first device and a plurality of estimated distances between locations of the projection devices and the estimated location of the first device according to the estimated orientation of the first device and the estimated location of the first device;
determining, through the second device, a second projection device of the projection devices according to the estimated angles of the projection devices relative to the estimated orientation of the first device and the estimated distances between the locations of the projection devices and the estimated location of the first device; and
switching, through the second device, to use the second projection device to project the display information.

10. The projection method as claimed in claim 9, wherein the step of switching to use the second projection device to project the display information further comprises:
switching, through the second device, to use the second projection device to project the display information when a distance between the first device and the first projection device is greater than a predetermined threshold.

11. A projection system comprising:
at least one projection device, wherein the projection device has a rotating mechanism;
a first device configured for:
sending an identification signal; and
receiving an identification response signal corresponding to the identification signal; and
a second device configured for:
acquiring a display information from a database according to the identification response signal;
acquiring at least one distance between the at least one projection device and the first device according to a present location of the first device;
controlling the rotating mechanism to rotate the at least one projection device according to a present orientation of the first device; and
controlling the at least one projection device to project the display information according to the at least one distance between the at least one projection device and the first device.

12. The projection system as claimed in claim 11, wherein the at least one projection device comprises a plurality of projection devices, and the second device is further configured for:
determining a first projection device from the projection devices according to distances between the projection devices and the first device;
rotating the first projection device of the projection devices according to the present orientation of the first device; and
controlling the first projection device to project the display information according to the a distance between the first projection device and the first device.

13. The projection system as claimed in claim 12, wherein the second device is further configured for:
calculating an estimated location and an estimated orientation of the first device according to a moving speed and a moving direction of the first device;
acquiring a plurality of estimated distances between locations of the projection devices and the estimated location of the first device according to the estimated location of the first device;
determining a second projection device of the projection devices according to the estimated distances between the locations of the projection devices and the estimated location of the first device;
rotating the second projection device according to the estimated orientation of the first device; and
switching to use the second projection device to project the display information.

14. The projection system as claimed in claim 13, wherein the second device is further configured for:

switching to use the second projection device to project the display information when a distance between the first device and the first projection device is greater than a predetermined threshold.

15. The projection system as claimed in claim 11, wherein the identification signal is sent from the first device to a third device, and the identification response signal is generated and sent by the third device according to the identification signal.

16. A projection method comprising:
    sending, through a first device, an identification signal;
    receiving, through the first device, an identification response signal corresponding to the identification signal;
    acquiring, through a second device, a display information from a database according to the identification response signal;
    acquiring, through a second device, at least one distance between at least one projection device and the first device according to a present location of the first device;
    controlling, through a second device, the rotating mechanism to rotate the at least one projection device according to a present orientation of the first device; and
    controlling, through a second device, the at least one projection device to project the display information according to the at least one distance between the at least one projection device and the first device.

17. The projection method as claimed in claim 16, wherein the at least one projection device comprises a plurality of projection devices, the projection method further comprising:
    determining, through a second device, a first projection device from the projection devices according to distances between the projection devices and the first device;
    wherein the step of controlling the rotating mechanism to rotate the at least one projection device according to the present orientation of the first device comprises:
        rotating, through a second device, the first projection device of the projection devices according to the present orientation of the first device;
    and wherein the step of controlling the at least one projection device to project the display information according to the at least one distance between the at least one projection device and the first device comprises:
        controlling, through a second device, the first projection device to project the display information according to the a distance between the first projection device and the first device.

18. The projection method as claimed in claim 17 further comprising:
    calculating, through a second device, an estimated location and an estimated orientation of the first device according to a moving speed and a moving direction of the first device;
    acquiring, through a second device, a plurality of estimated distances between locations of the projection devices and the estimated location of the first device according to the estimated location of the first device;
    determining, through a second device, a second projection device of the projection devices according to the estimated distances between the locations of the projection devices and the estimated location of the first device;
    rotating, through a second device, the second projection device according to the estimated orientation of the first device; and
    switching, through a second device, to use the second projection device to project the display information.

19. The projection method as claimed in claim 18, wherein the step of switching to use the second projection device to project the display information further comprises:
    switching to use the second projection device to project the display information when a distance between the first device and the first projection device is greater than a predetermined threshold.

20. The projection method as claimed in claim 16, wherein the identification signal is sent from the first device to a third device, and the identification response signal is generated and sent by the third device according to the identification signal.

* * * * *